United States Patent
Kim et al.

(10) Patent No.: US 10,112,863 B2
(45) Date of Patent: Oct. 30, 2018

(54) FLOAT GLASS AND METHOD OF MANUFACTURING THE SAME

(71) Applicant: SAMSUNG DISPLAY CO., LTD., Yongin-si, Gyeonggi-do (KR)

(72) Inventors: Seung Kim, Seongnam-si (KR); Myung Hwan Kim, Seongnam-si (KR); Seung Ho Kim, Asan-si (KR); June Hyoung Park, Seoul (KR); Hoi Kwan Lee, Anseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 235 days.

(21) Appl. No.: 15/147,927

(22) Filed: May 6, 2016

(65) Prior Publication Data

US 2017/0113963 A1    Apr. 27, 2017

(30) Foreign Application Priority Data

Oct. 26, 2015    (KR) ........................ 10-2015-0148627

(51) Int. Cl.
| | |
|---|---|
| C03C 4/18 | (2006.01) |
| C03B 18/02 | (2006.01) |
| C03C 3/04 | (2006.01) |
| C03C 21/00 | (2006.01) |
| C03B 25/08 | (2006.01) |
| C03B 29/08 | (2006.01) |

(52) U.S. Cl.
CPC .............. *C03B 18/02* (2013.01); *C03B 25/08* (2013.01); *C03B 29/08* (2013.01); *C03C 21/002* (2013.01)

(58) Field of Classification Search
None
See application file for complete search history.

(56) References Cited

U.S. PATENT DOCUMENTS

| | | | |
|---|---|---|---|
| 9,764,980 B2 * | 9/2017 | Senshu | .................... C03C 3/087 |
| 9,890,073 B2 * | 2/2018 | Kase | ....................... C03C 3/087 |
| 2014/0178690 A1 | 6/2014 | Kreski | |
| 2014/0178691 A1 | 6/2014 | Kreski | |

FOREIGN PATENT DOCUMENTS

| | | |
|---|---|---|
| JP | 2014218427 A | 11/2014 |
| KR | 1020100076907 A | 7/2010 |
| KR | 101298236 B1 | 8/2013 |
| KR | 101370596 B1 | 2/2014 |
| KR | 1020140075683 A | 6/2014 |
| KR | 1020140118998 A | 10/2014 |
| KR | 101469506 B1 | 12/2014 |

* cited by examiner

*Primary Examiner* — John J Figueroa
(74) *Attorney, Agent, or Firm* — Cantor Colburn LLP (57) ABSTRACT

A float glass includes a core layer, an upper ion exchange layer disposed on the core layer, and a lower ion exchange layer disposed below the core layer, where a density of the upper ion exchange layer is about 0.001 kilogram per cubic meter ($kg/m^3$) to about 0.01 $kg/m^3$ greater than a density of the lower ion exchange layer.

19 Claims, 9 Drawing Sheets

FLOAT GLASS AND METHOD OF MANUFACTURING THE SAME

This application claims priority to Korean Patent Application No. 10-2015-0148627, filed on Oct. 26, 2015, and all the benefits accruing therefrom under 35 U.S.C. § 119, the content of which in its entirety is herein incorporated by reference.

BACKGROUND

1. Field

Exemplary embodiments of the invention relate to a float glass and a method of manufacturing the same.

2. Description of the Related Art

For a display device such as a liquid crystal display ("LCD") or an organic light-emitting diode ("OLED") display, a plate-shaped cover glass may be disposed for the purpose of, for example, protecting the inner elements or improving the aesthetic appearance of the display device. As display devices becomes lighter and thinner, the cover glass, which is part of the display device, also becomes thinner.

A plate-shaped glass is generally fabricated by a float method or a fusion down draw method. The fusion down draw method is more costly than the float method.

Thus, a research for fabricating a thin glass with improved shock resistance using the float method has been conducted.

SUMMARY

Exemplary embodiments of the invention provide a float glass, which is fabricated by a float method to be sufficiently thin and have excellent shock resistance, and a method of manufacturing the float glass.

Exemplary embodiments of the invention also provide a float glass, which is capable of being prevented from being bent, and a method of manufacturing the float glass.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment, a float glass includes a core layer, an upper ion exchange layer disposed on the core layer, and a lower ion exchange layer disposed below the core layer, where a density of the upper ion exchange layer is about 0.001 kilogram per cubic meter ($kg/m^3$) to about 0.01 $kg/m^3$ greater than a density of the lower ion exchange layer.

In an exemplary embodiment, the lower ion exchange layer may include tin (Sn) ions.

In an exemplary embodiment, the upper ion exchange layer and the lower ion exchange layer may include alkali metal ions.

In an exemplary embodiment, the upper ion exchange layer and the lower ion exchange layer may include at least one of sodium (Na) ions, potassium (K) ions, rubidium (Rb) ions, and cesium (Cs) ions.

In an exemplary embodiment, a thickness of the float glass may range from about 0.05 millimeters (mm) to about 0.7 mm.

In an exemplary embodiment, a difference between a depth of layer ("DOL") of the upper ion exchange layer and a DOL of the lower ion exchange layer may range from about 0.01 micrometer (μm) to about 1.0 μm.

In an exemplary embodiment, the DOL of the upper ion exchange layer may range from about 5.0 μm to about 100 μm.

In an exemplary embodiment, a difference between a compressive stress of the upper ion exchange layer and a compressive stress of the lower ion exchange layer may range from about 0 megapascal (MPa) to about 100 MPa.

In an exemplary embodiment, the compressive stress of the upper ion exchange layer may range from about 600 MPa to about 1500 MPa.

According to an exemplary embodiment, a method of manufacturing a float glass includes molding a glass substrate by floating a molten glass raw material on molten tin in bath, thermally treating a bottom surface of the molded glass substrate that is in contact with the molten tin and a top surface of the molded glass substrate that is not in contact with the molten tin, and chemically strengthening the glass substrate, where the thermally treating includes thermally treating the top surface of the glass substrate at a higher temperature than the bottom surface of the glass substrate.

In an exemplary embodiment, the thermally treating may further include thermally treating the top surface of the glass substrate at a temperature about 50 degrees Celsius (° C.) to about 70° C. higher than a temperature at which to thermally treat the bottom surface of the glass substrate.

In an exemplary embodiment, the thermally treating may further include thermally treating the top surface of the glass substrate at a temperature of about 500° C. to about 680° C.

In an exemplary embodiment, a Young's modulus of the top surface of the glass substrate may be increased by about 1 gigapascal (GPa) to about 6 GPa by the thermally treating.

In an exemplary embodiment, a Young's modulus of the top surface of the glass substrate yet to be thermally treated may range from about 65 GPa to about 80 GPa.

In an exemplary embodiment, a Young's modulus of the bottom surface of the glass substrate yet to be thermally treated may range from about 60 GPa to about 85 GPa.

In an exemplary embodiment, a density of the top surface of the glass substrate may be about 0.001 $kg/m^3$ to about 0.01 $kg/m^3$ greater than a density of the bottom surface of the glass substrate by the thermally treating.

In an exemplary embodiment, a difference between a DOL of the top surface of the glass substrate and a DOL of the bottom surface of the glass substrate may range from about 0.01 μm to about 1.0 μm by chemically strengthening.

In an exemplary embodiment, the bottom surface of the glass substrate may include Sb ions.

In an exemplary embodiment, the thermally treating may include using one of an induction heating furnace, a tunnel furnace, a rapid thermal process ("RTP"), rapid thermal annealing ("RTA") equipment, and a laser process.

In an exemplary embodiment, the chemically strengthening may include immersing the glass substrate in a molten salt including at least one of Na ions, K ions, Rb ions, and Cs ions.

According to the exemplary embodiments, a float glass that is sufficiently thin and has excellent shock resistance may be provided.

In addition, a float glass that can be prevented from being bent due to stress imbalance between on both surfaces thereof may be provided.

Other features and exemplary embodiments will be apparent from the following detailed description, the drawings, and the claims.

BRIEF DESCRIPTION OF THE DRAWINGS

The above and other exemplary embodiments, advantages and features of this invention will become more apparent by describing in further detail exemplary embodiments thereof with reference to the accompanying drawings, in which.

DETAILED DESCRIPTION

Features of the invention and methods of accomplishing the same may be understood more readily by reference to the following detailed description of preferred embodiments and the accompanying drawings.

The invention may, however, be embodied in many different forms and should not be construed as being limited to the embodiments set forth herein. Rather, these embodiments are provided so that this invention will be thorough and complete and will fully convey the concept of the invention to those skilled in the art, and the invention will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "bottom," "below," "lower," "under," "above," "upper," "top" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Exemplary embodiments of the invention will hereinafter be described with reference to the accompanying drawings.

Figure 1:
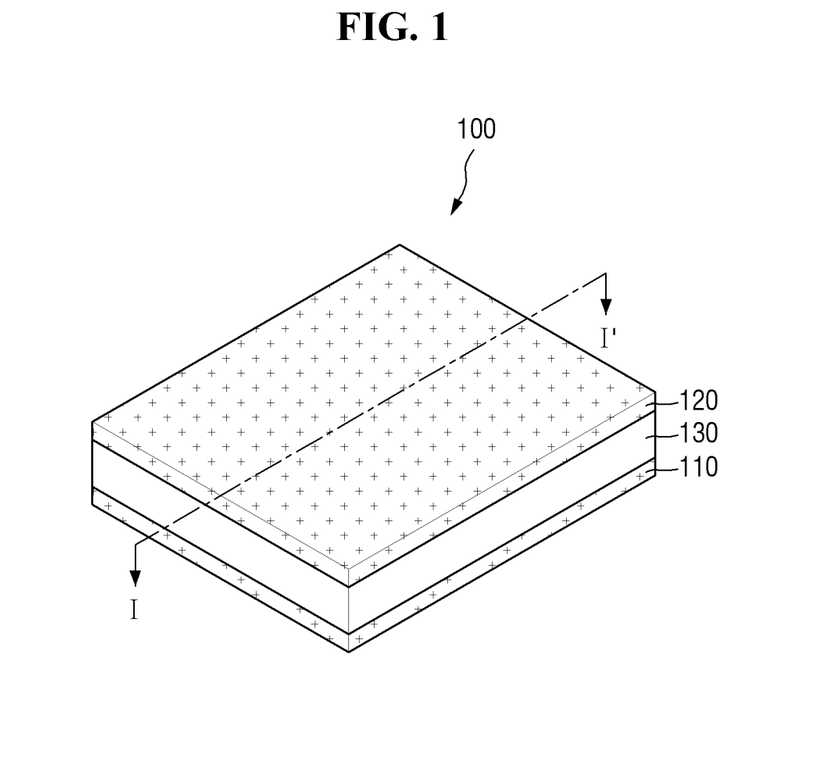
FIG. 1 is a perspective view of an exemplary embodiment of a float glass according to the invention.
Figure 2:
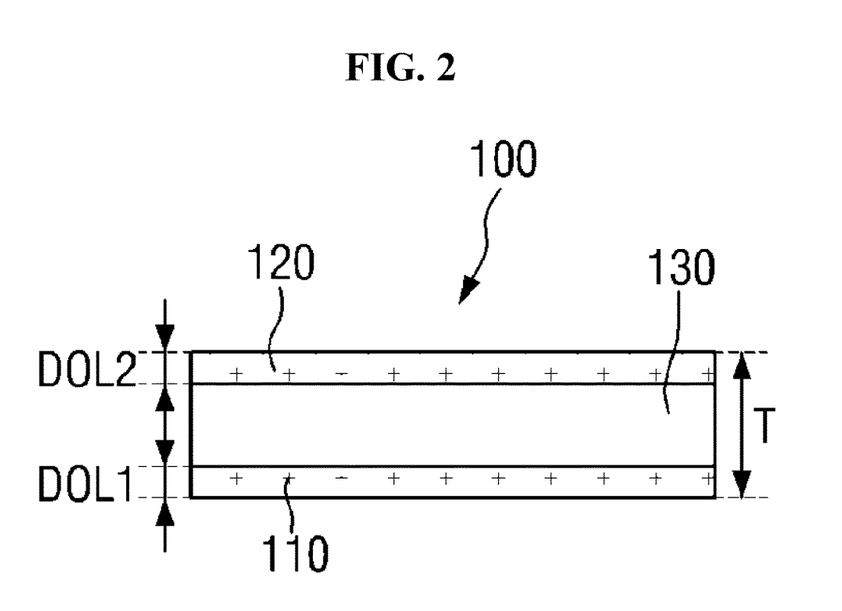
FIG. 2 is a cross-sectional view taken along line I-I' of FIG. 1.

FIG. 1 is a perspective view of a float glass according to an exemplary embodiment of the invention, and FIG. 2 is a cross-sectional view taken along line I-I' of FIG. 1.

Referring to FIGS. 1 and 2, a float glass 100 includes a core layer 130, an upper ion exchange layer 120, which is disposed on the core layer 130, and a lower ion exchange layer 110, which is disposed below the core layer 130. That is, the float glass 100 may include the upper ion exchange layer 120 and the lower ion exchange layer 110, which are provided on the top and bottom surfaces, respectively, of the float glass 100 and are substituted with chemically strengthening ions by chemical strengthening.

In an exemplary embodiment, the float glass 100 may include $SiO_2$ as a main ingredient thereof, and may also include ingredients such as $Al_2O_3$, $LiO_2$ and $Na_2O$. However, the invention is not limited to this. That is, the float glass 100 may also include various ingredients other than those set forth herein, as necessary.

In response to the float glass 100 including, for example, $LiO_2$ or $Na_2O$, the float glass 100 may be immersed in a salt such as potassium nitrate ($KNO_3$) in a chemical strengthening process and may thus be chemically strengthened by K—Li ion exchange or K—Na ion exchange, which occurs on both surfaces of the float glass 100. As a result of the ion exchange, the chemical durability of the float glass 100 may be improved, and by increasing the compressive stress of the float glass 100, the mechanical durability of the float glass 100 may be improved.

As a result of the chemical strengthening process, the float glass 100 may include the upper ion exchange layer 120, which is obtained from the ion exchange occurring at the top surface of the core layer 130, and the lower ion exchange layer 110, which is obtained from the ion exchange occurring at the bottom surface of the core layer 130.

In an exemplary embodiment, the density of the upper ion exchange layer 120 may be about 0.001 kilogram per cubic meter ($kg/m^3$) to about 0.01 $kg/m^3$ higher than the density of the lower ion exchange layer 110, for example. This difference between the density of the upper ion exchange layer 120 and the density of the lower ion exchange layer 110 may be generated due to the top and bottom surfaces of the core layer 130 being subjected to a thermal treatment process at different temperatures.

More specifically, in the process of manufacturing the float glass 100, the lower ion exchange layer 110 may be provided, through molding, on molten tin (Sn) in a bath due to a difference in density, in which case some Sn ions on the molten tin may infiltrate into the lower ion exchange layer 110. Due to the Sn ions infiltrating into the lower ion exchange layer 110, ion exchange may occur less severely in the lower ion exchange layer 110 than in the upper ion exchange layer 120. However, the difference in the degree to which ions are exchanged between the lower ion exchange layer 110 and the upper ion exchange layer 120 on both sides of the float glass 100 may lead to differences in compressive stress and depth of layer ("DOL") between the lower ion exchange layer 110 and the upper ion exchange layer 120, and eventually, the float glass 100 may be bent.

In the illustrated exemplary embodiment, the density of the upper ion exchange layer 120 may be about 0.001 $kg/m^3$ to about 0.01 $kg/m^3$ higher than the density of the lower ion exchange layer 110, for example. Thus, ion exchange may be allowed to occur less severely in the upper ion exchange layer 120 during the chemical strengthening process, the differences in compressive stress and DOL between the lower ion exchange layer 110 and the upper ion exchange layer 120 may be reduced, and as a result, the risk of the float glass 100 being bent may be lowered.

In an exemplary embodiment, the upper ion exchange layer 120 and the lower ion exchange layer 110 may include alkali metal ions, for example. More specifically, the upper ion exchange layer 120 and the lower ion exchange layer 110 may include at least one of sodium (Na) ions, potassium (K) ions, rubidium (Rb) ions, and cesium (Cs) ions, and preferably, K ions, for example. In the chemical strengthening process, alkali metal ions in a molten salt may be subjected to ion exchange at the surfaces of the float glass 100, and as a result, the upper ion exchange layer 120 and the lower ion exchange layer 110, which are disposed on the surfaces of the float glass 100, may include the alkali metal ions.

The type of ions included in the upper ion exchange layer 120 and the lower ion exchange layer 110 may vary depending on the type of molten salt used in the chemical strengthening process. In an exemplary embodiment, in response to the molten salt used in the chemical strengthening process being sodium nitrate ($NaNO_3$) comprising Na ions, the upper ion exchange layer 120 and the lower ion exchange layer 110 may include Na ions, and in response to $KNO_3$ comprising K ions and $NaNO_3$ comprising Na ions both being used in the molten salt used in the chemical strengthening process, the upper ion exchange layer 120 and the lower ion exchange layer 110 may include both K ions and Na ions, for example.

In an exemplary embodiment, the thickness T of the float glass 100 may range from about 0.05 millimeter (mm) to 0.7 mm, for example, from about 0.1 mm to about 0.4 mm. The risk of the float glass 100 being bent due to differences in compressive stress and DOL between both surfaces of the float glass 100 may be apparent especially when the float glass 100 is thin. Thus, in response to the difference between the density of the upper ion exchange layer 120 and the density of the lower ion exchange layer 110 satisfying the range of about 0.001 $kg/m^3$ to about 0.01 $kg/m^3$, the float glass 100 may be prevented from being bent, while sufficiently reducing the thickness T of the float glass 100.

In an exemplary embodiment, the difference between a DOL DOL2 of the upper ion exchange layer 120 and a DOL DOL1 of the lower ion exchange layer 110 may range from about 0 micrometer (μm) to about 1.0 μm or from about 0.01 μm to about 1.0 μm, for example, in which case the risk of the float glass 100 being bent may be effectively lowered. More specifically, the DOL DOL2 may be larger than the DOL DOL1 by 0.01 μm to 1.0 μm, and by doing so, the risk of the float glass 100 being bent may be effectively lowered, for example. In an exemplary embodiment, the DOL DOL2 may range from about 5.0 μm to 100 μm, and the DOL DOL1 may range from about 4.0 μm to about 99.99 μm, about 4.99 μm to about 99.99 μm, or about 4.99 μm to about 99 μm, for example. However, the invention is not limited to this example.

In an exemplary embodiment, the difference between the compressive stress of the upper ion exchange layer 120 and the compressive stress of the lower ion exchange layer 110 may range from about 0 megapascal (MPa) to about 100 MPa or from about 5 MPa to about 15 MPa, for example, in which case the risk of the float glass 100 being bent may be effectively lowered. More specifically, the compressive stress of the upper ion exchange layer 120 may be about 5 MPa to about 15 MPa lower than the compressive stress of the lower ion exchange layer 110, in which case the risk of the float glass 100 being bent may be effectively lowered. In an exemplary embodiment, the compressive stress of the upper ion exchange layer 120 may range from about 600 MPa to about 1500 MPa, and the compressive stress of the lower ion exchange layer 110 may range from about 600 MPa to about 1600 MPa, about 605 MPa to about 1600 MPa, or about 605 MPa to about 1515 MPa, for example. However, the invention is not limited to this example.

Figure 3:
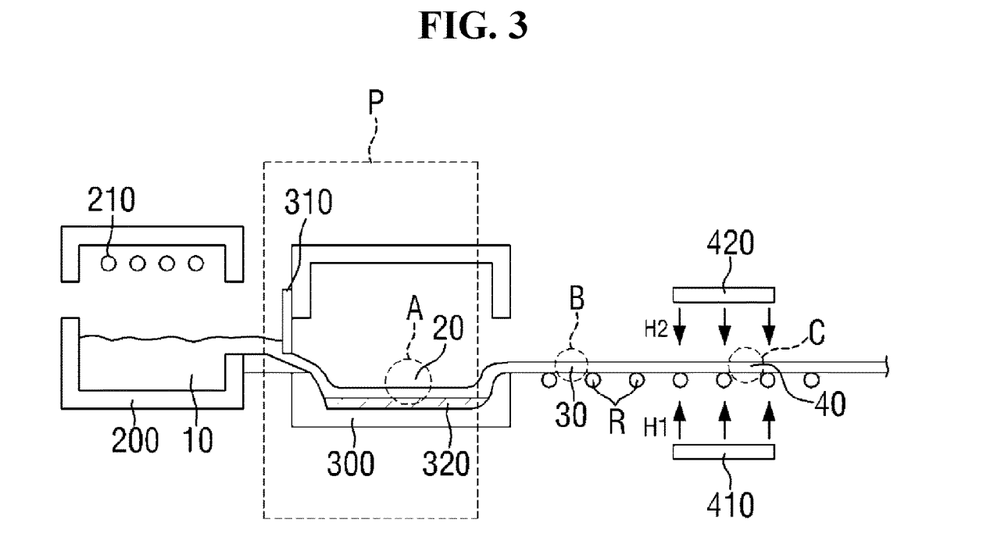
FIGS. 3 and 4 are schematic views illustrating an exemplary embodiment of a method of manufacturing a float glass according to the invention.
Figure 4:
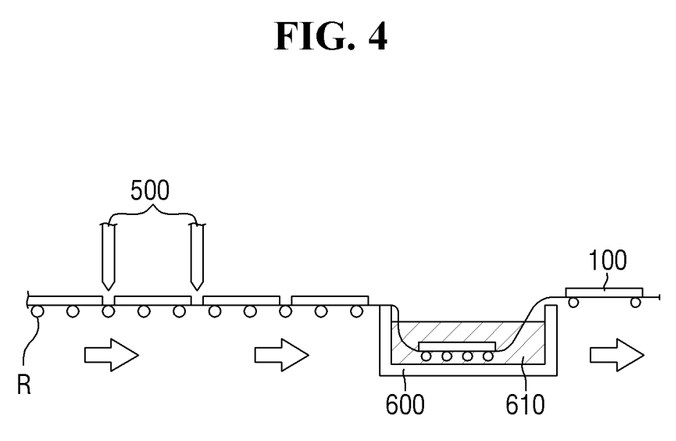
Figure 5:
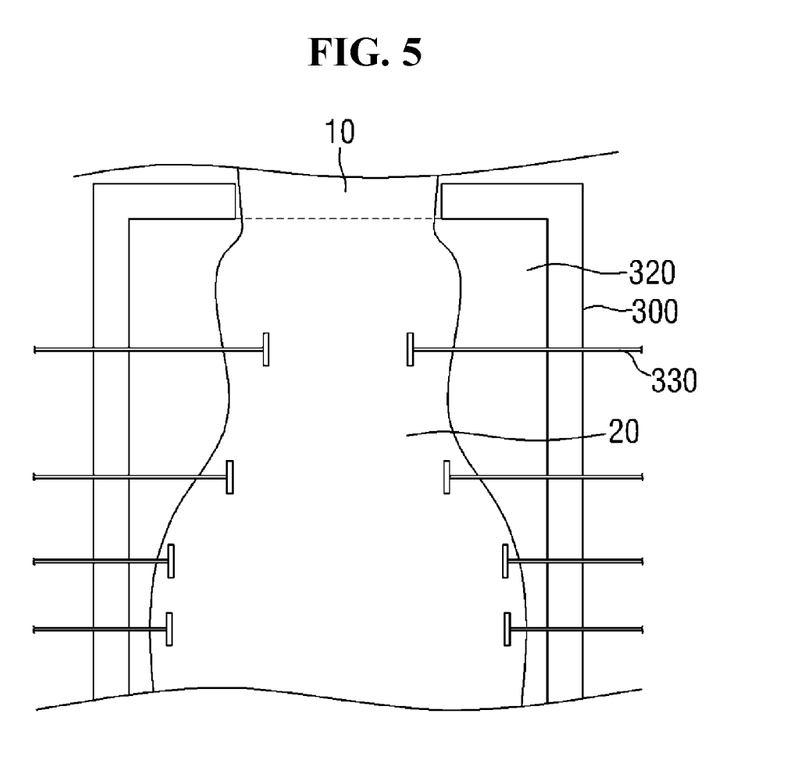
FIG. 5 is a plan view of an area P of FIG. 3.
Figure 6:
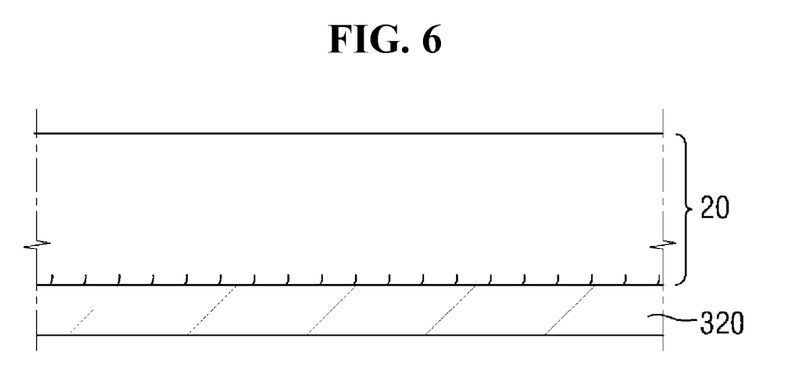
FIG. 6 is an enlarged cross-sectional view of an area A of FIG. 3.
Figure 7:
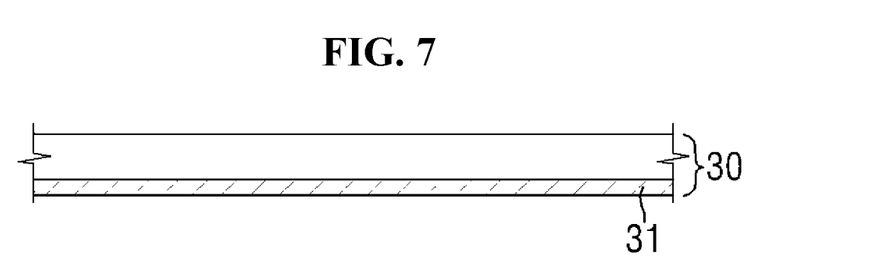
FIG. 7 is an enlarged cross-sectional view of an area B of FIG. 3.
Figure 8:
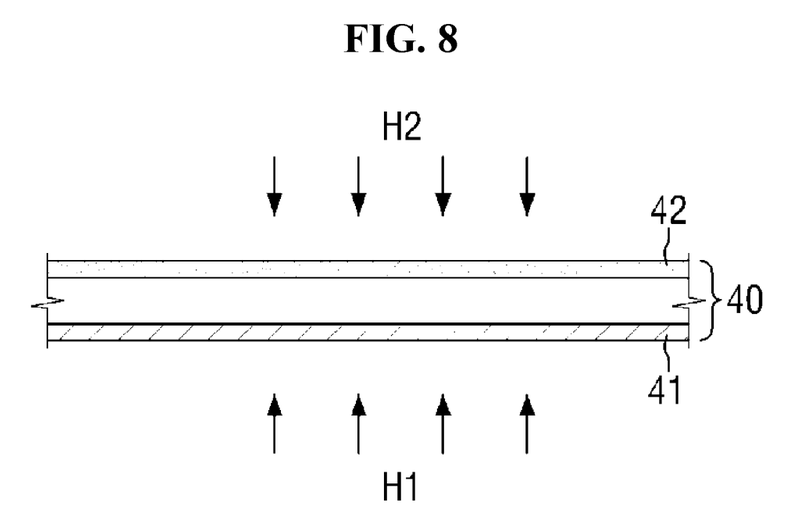
FIG. 8 is an enlarged cross-sectional view of an area C of FIG. 3.

FIGS. 3 and 4 are schematic views illustrating a method of manufacturing a float glass according to an exemplary embodiment of the invention, FIG. 5 is a plan view of an area P of FIG. 3, FIG. 6 is an enlarged cross-sectional view of an area A of FIG. 3, FIG. 7 is an enlarged cross-sectional view of an area B of FIG. 3, and FIG. 8 is an enlarged cross-sectional view of an area C of FIG. 3.

A method of manufacturing a float glass according to an exemplary embodiment of the invention will hereinafter be described with reference to FIGS. 3 to 8.

Referring to FIGS. 3 and 4, the method includes molding a glass substrate 30 by floating a molten glass raw material 20 on molten tin 320 in a bath 300, thermally treating the bottom surface of the glass substrate 30 that is in contact with the molten tin 320 and on the top surface of the glass substrate 30 that is not in contact with the molten tin 320, and chemically strengthening a glass substrate 40 obtained from the thermal treatment by immersing the glass substrate 40 in a molten salt 610 in a chemical strengthening bath 600. The method may be performed by a series of processes, and during the manufacture of a float glass, the glass substrate 30 or 40 may be transferred by moving a conveyor belt with rollers R.

The molten glass raw material 10 may be heated by a heating source 210 in a melting chamber 200 and may thus be melted. The heating source 210 may heat the molten glass raw material 10 to a temperature higher than the melting point of the molten glass raw material 10. The preparation of the molten glass raw material 10 in the melting chamber 200 is already well known in the art to which the invention pertains, and thus, a detailed description thereof will be omitted.

The molten glass raw material 10 may be molded into the glass substrate 20 in the bath 300. More specifically, as illustrated in FIGS. 3 and 5, the molten glass raw material 10 may be injected into the bath 300 in an amorphous state. The bath 300 may include an opening/closing unit 310, which allows a predetermined amount of the molten glass raw material 10 to be injected into the bath 300 from the melting chamber 200. Once the predetermined amount of the molten glass raw material 10 is injected into the bath 300, the opening/closing unit 310 may block the molten glass raw material 10 from being further injected into the bath 300.

The molten tin 320 may be included in the bath 300. In an exemplary embodiment, tin melted at a temperature of about 700° C. to about 1200° C. may be included in the bath 300, for example. Due to the molten glass raw material 10 and the molten tin 320 having different densities, the molten glass raw material 10 may be located above the molten tin 320. That is, the molten glass raw material 10 may be molded while being floated over the molten tin 320.

The molten glass raw material 10 injected into the bath 300 in the amorphous state may be molded into a glass substrate of a desired shape by being pulled to the left and the right over the horizontal plane of the bath 300 with a plurality of molding bars 330. Due to the presence of the molten tin 320 below the glass substrate 20, some Sn ions from the molten tin 320 may infiltrate into the bottom surface of the glass substrate 20, as illustrated in FIG. 6, during the molding of the glass substrate 20. Thus, a layer 31 comprising Sn ions may be disposed on the bottom surface of the glass substrate 30 obtained from a molding process performed in the bath 300.

Sn ions included in the bottom of the glass substrate 30 may cause a difference in the speed of ion exchange between the top and the bottom of the glass substrate 30 in a chemical strengthening process and may thus cause differences in compressive stress and DOL between the top and the bottom of a float glass substrate. As a result, the float glass substrate may be bent.

To address this problem, a top surface 42 and a bottom surface 41 of the glass substrate 40 may be subjected to a thermal treatment process differently from each other, as illustrated in FIGS. 3 and 8. More specifically, the thermal treatment process may be performed by applying a higher temperature to the top surface 42 of the glass substrate 40 than to the bottom surface 41 of the glass substrate 40 (i.e., H2>H1). The bottom surface 41 of the glass substrate 40 may be heated by a first heating source 410, and the top surface 42 of the glass substrate 40 may be heated by a second heating source 420. By heating the top surface 42 of the glass substrate 40 to a temperature H2, which is higher than a temperature H1 to which the bottom surface 41 of the glass substrate 40 is heated, the glass structure at the top surface 42 of the glass substrate 40 may become densified, thereby increasing the glass density at the top surface 42 of the glass substrate 40.

As a result, in the chemical strengthening process, which is followed by the thermal treatment process, the degree to which ion exchange occurs at the top surface 42 of the glass substrate 40 may become less severe than before, and substantially equal to the degree to which ion exchange occurs at the bottom surface 41 of the glass substrate 40. In other words, due to the presence of Sn ions at the bottom surface 41 of the glass substrate 40, ion exchange may occur less severely at the bottom surface 41 of the glass substrate 40 than at the top surface 42 of the glass substrate 40, and this may be compensated for by densifying the glass structure at the top surface 42 of the glass substrate 40. As a result of the thermal treatment process, the density at the top surface 42 of the glass substrate 40 may become about 0.001 $kg/m^3$ to about 0.01 $kg/m^3$ higher than the density at the bottom surface 41 of the glass substrate 40.

In an exemplary embodiment, the thermal treatment process may be performed using one of an induction heating furnace, a tunnel furnace, a rapid thermal process ("RTP"), rapid thermal annealing ("RTA") equipment, and a laser process, for example, but the invention is not limited thereto. That is, any method and apparatus capable of differently applying heat to the top surface 42 and the bottom surface 41 of the glass substrate 40 may be used.

In an exemplary embodiment, the temperature H2 of the top surface 42 of the glass substrate 40 may be about 50° C. to 70° C. higher than the temperature H1 of the bottom surface 41 of the glass substrate 40, for example. In an exemplary embodiment, the temperature H2 of the top surface 42 of the glass substrate 40 may be, but is not limited to, about 500° C. to 680° C., for example. That is, the temperature H2 of the top surface 42 of the glass substrate 40 may be determined based on the ingredients, the thickness, and the initial stress distribution of the glass substrate 40 and/or the conditions of the strengthening process to be in the range between the glass strain point and the glass transition temperature of the glass substrate 40.

In an exemplary embodiment, the Young's modulus at the top surface 42 of the glass substrate 40 may become about 1 gigapascal (GPa) to about 6 GPa higher than before. As described above, Sn ions may be included at the bottom surface of the glass substrate 30, and thus, the Young's modulus at the top surface of the glass substrate 30 may be about 0.1 GPa to about 5 GPa lower than the bottom surface of the glass substrate 30. In an exemplary embodiment, the Young's modulus of the top surface of the glass substrate 30, which is yet to be subjected to the thermal treatment process, may range from about 65 GPa to about 80 GPa, and the Young's modulus of the bottom surface of the glass substrate 30 may range from about 60 GPa to about 85 GPa, for example. The difference in Young's modulus between the top surface and the bottom surface of the glass substrate 30 may become a factor causing a bend in a float glass substrate.

By increasing the Young's modulus at the top surface of the glass substrate 30 by about 1 GPa to about 6 GPa through the thermal treatment process, a factor causing a bend in a float glass substrate may be eliminated or at least minimized. That is, by minimizing the difference in Young's modulus between the top surface and the bottom surface of the glass substrate 30, which is yet to be subjected to the thermal treatment process, a float glass substrate may be prevented from being bent.

Referring back to FIG. 4, a cutting process for cutting glass with a cutter 500 may be performed between the thermal treatment process and the chemical strengthening process. As a result of the cutting process, a glass substrate of a desired size may be prepared. However, the invention is not limited to this. That is, in an alternative exemplary embodiment, the cutting process may be performed after the chemical strengthening process.

In an exemplary embodiment, the chemical strengthening process may be a single-salt wet chemical strengthening process, for example. More specifically, the chemical strengthening process may be performed by immersing the glass substrate 40 in a molten salt 610, which is included in an immersion tank 600 and comprises a salt of alkali metal ions, and the alkali metal ions may include at least one of Na ions, K ions, Rb ions, and Cs ions, for example. That is, the chemical strengthening process may be performed using the molten salt 610 of Na, K, Rb, and/or Cs ions, for example. In an exemplary embodiment, wet chemical strengthening may be suitable from the perspective of mass production and may realize a uniform strengthening characteristic. In exemplary embodiments, dry chemical strengthening may be performed.

In an exemplary embodiment, in the chemical strengthening process, a molten salt such as $KNO_3$ or $NaNO_3$ may be used, and the chemical strengthening process may be performed at a molten salt temperature of about 300° C. to about 500° C. for about one to thirty hours, for example. The chemical strengthening process may allow alkali ions at the surface of the float glass 100 to be exchanged with ions with a larger ion radius.

In exemplary embodiments, the chemical strengthening process may include a preheating step, a main chemical strengthening step, and an annealing step, for example. The preheating step may improve the uniformity of chemical strengthening and may prevent glass from being broken or damaged by thermal shock. The annealing step imparts compressive stress to the surface of glass and also prevents the glass from being broken or damaged by thermal shock.

After the chemical strengthening process, a rinsing process for removing any foreign materials from the surface of the float glass 100 may be additionally performed. The rinsing process may remove any residues such as a molten salt that still remains on the surface of the float glass 100 after the chemical strengthening process 100, and may be performed by using a rinsing agent such as water or by carrying out an immersion method while applying ultrasonic waves.

As a result of the chemical strengthening process, the difference in DOL between the top surface and the bottom surface of the glass substrate 40 may be in the range of about 0 μm to about 1.0 μm or about 0.01 μm to about 0.5 μm, for example. That is, as a result of the thermal treatment process, a difference in density may be generated between the top surface and the bottom surface of the glass substrate 40, and as a result, the difference in DOL between the top surface and the bottom surface of the glass substrate 40 may be reduced. Also, as a result of the chemical strengthening process, the difference in compressive stress between the top surface and the bottom surface of the glass substrate 40 may be in the range of about 0 MPa to about 100 MPa or about 5 MPa to about 15 MPa, for example. Therefore, the float glass 100 may be effectively prevented from being bent.

The float glass 100 will hereinafter be described in further detail with reference to experimental data.

<Exemplary Embodiment>

Asahi Glass's soda lime glass was prepared, and was subjected to thermal treatment for about five minutes substantially at an annealing point temperature by using RTA equipment equipped with an infrared ("IR") lamp heater only at the top thereof. Thereafter, the soda lime glass was subjected to $KNO_3$ wet chemical strengthening using an immersion method, thereby obtaining a float glass. Thereafter, compressive stress and DOL were measured from the top and bottom surfaces of the float glass using Toshiba's FSM-600LE. The results of the measurement are as shown in Table 1.

TABLE 1

|  | Top Surface | Bottom Surface | Difference |
| --- | --- | --- | --- |
| Compressive Stress (MPa) | 812 | 823 | 11 |
| DOL (μm) | 9.2 | 9.0 | 0.2 |

COMPARATIVE EXAMPLE

A float glass was fabricated by using the same method used to fabricate the float glass according to Exemplary Embodiment except for not performing a thermal treatment process. Thereafter, compressive stress and DOL were measured from the top and bottom surfaces of the float glass. The results of the measurement are as shown in Table 2.

TABLE 2

|  | Top Surface | Bottom Surface | Difference |
| --- | --- | --- | --- |
| Compressive Stress (MPa) | 614 | 652 | 38 |
| DOL (μm) | 13.32 | 12.88 | 0.44 |

EXPERIMENTAL EXAMPLE 1

Comparison of Properties of Float Glasses Obtained from Different Thermal Treatment Temperatures Corning's Gorilla-3 glass samples were prepared, and were subjected to thermal treatment at a temperature of about 570° C. to about 650° C. The relationship between the compressive stress of the glass samples and the temperature at which the glass samples were subjected to thermal treatment is as illustrated in FIG. 9.

Figure 9:
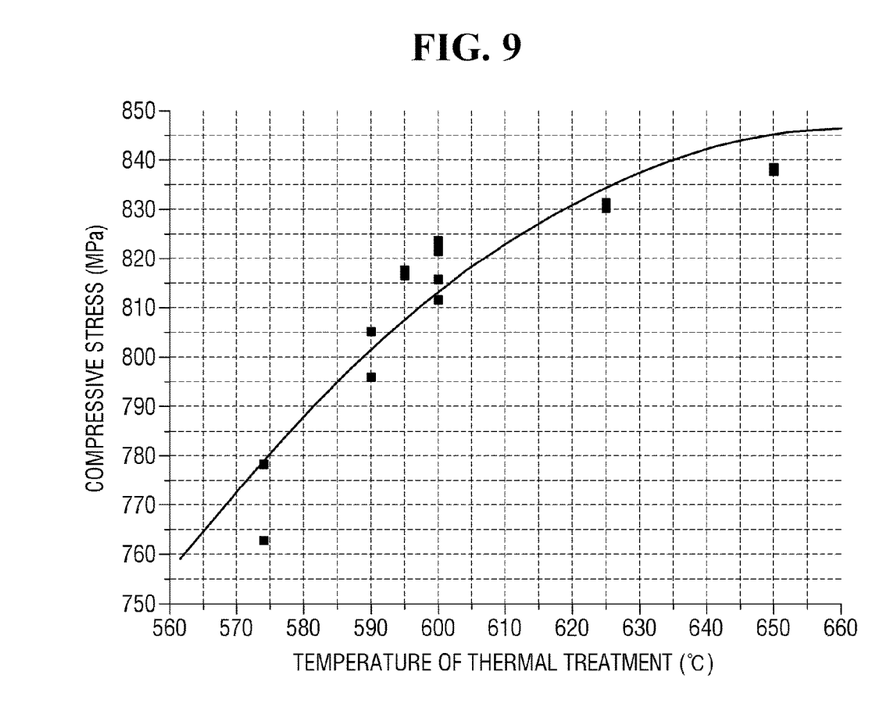
FIG. 9 is a graph showing experimental results according to Experimental Example 1.

Referring to FIG. 9, the properties of the glass samples, i.e., the compressive stress of the glass samples, were improved after thermal treatment, and it is clear that there is a dependency between the properties of the sample glasses and the temperature at which the glass samples were subjected to thermal treatment. The improved properties of the sample glasses may be affected by the temperature and duration at which the sample glasses were subjected to chemical strengthening, the purity of salt used in chemical strengthening, the thickness of the glass samples, and the initial distribution of the compressive stress of the glass samples.

EXPERIMENTAL EXAMPLE 2

Comparison of Properties of Float Glasses Before and after Thermal Treatment

Two different types of float glass samples, i.e., first and second samples, were prepared and were subjected to thermal treatment such that the first and second samples could have the same DOL as before. The compressive stress of the first and second samples and any variations therein were measured before and after thermal treatment. The results of the measurement are as shown in Table 3.

TABLE 3

|  | First Sample Glass | Second Sample Glass |
| --- | --- | --- |
| Compressive Stress before Thermal Treatment (MPa) | 790 | 804 |
| Compressive Stress after Thermal Treatment (MPa) | 831 | 839 |

Referring to Table 3, the properties of the first and second sample glasses, i.e., the compressive stress of the first and second sample glasses, are improved before and after thermal treatment.

EXPERIMENTAL EXAMPLE 3

Comparison of Young's Modulus Before and after Thermal Treatment

Asahi Glass's soda lime glass was prepared and was subjected to thermal treatment, as performed in the method of manufacturing a float glass according to an exemplary embodiment of the invention. The Young's modulus of each of the top surface and the bottom surface of the soda lime glass was measured before and after thermal treatment using Anton Paar's nano-indentation equipment. The results of the measurement are as shown in Table 4.

TABLE 4

|  | Top Surface | Bottom Surface | Difference |
| --- | --- | --- | --- |
| Young's Modulus before Thermal Treatment (GPa) | 67.6 | 68.4 | 0.8 |
| Young's Modulus after Thermal Treatment (GPa) | 72.8 | 73.2 | 0.4 |
| Difference (GPa) | 5.2 | 4.8 |  |

Referring to Table 4, a Young's modulus improvement was detected from both the top surface and the bottom surface of the soda lime glass, and this may be due to the densification of the structure of the soda lime glass by thermal treatment. The Young's modulus improvement was more significant in the top surface than in the bottom surface of the soda lime glass, and this means that the difference in Young's modulus between the top surface and the bottom surface of the soda lime glass may be reduced by thermal treatment.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:
1. A float glass comprising:
a core layer;
an upper ion exchange layer disposed on the core layer; and
a lower ion exchange layer disposed below the core layer,
wherein a density of the upper ion exchange layer is about 0.001 kilogram per cubic meter to about 0.01 kilogram per cubic meter greater than a density of the lower ion exchange layer, and
wherein a difference between a depth of layer of the upper ion exchange layer and a depth of layer of the lower ion exchange layer ranges from about 0.01 micrometer to about 1.0 micrometer.
2. The float glass of claim 1, wherein the lower ion exchange layer comprises tin (Sn) ions.
3. The float glass of claim 1, wherein the upper ion exchange layer and the lower ion exchange layer comprise alkali metal ions.
4. The float glass of claim 1, wherein the upper ion exchange layer and the lower ion exchange layer comprise at least one of sodium (Na) ions, potassium (K) ions, rubidium (Rb) ions, and cesium (Cs) ions.
5. The float glass of claim 1, wherein a thickness of the float glass ranges from about 0.05 millimeters to about 0.7 millimeters.
6. The float glass of claim 1, wherein the depth of layer of the upper ion exchange layer ranges from about 5.0 micrometers to about 100 micrometers.
7. The float glass of claim 1, wherein a difference between a compressive stress of the upper ion exchange layer and a compressive stress of the lower ion exchange layer ranges from about 0 megapascal to about 100 megapascal.
8. The float glass of claim 7, wherein the compressive stress of the upper ion exchange layer ranges from about 600 megapascal to about 1500 megapascal.
9. A method of manufacturing a float glass, the method comprising:
molding a glass substrate by floating a molten glass raw material on molten tin in a bath;
thermally treating a bottom surface of the molded glass substrate which is in contact with the molten tin and a top surface of the molded glass substrate which is not in contact with the molten tin; and
chemically strengthening the glass substrate,
wherein the thermally treating comprises thermally treating the top surface of the glass substrate at a higher temperature than the bottom surface of the glass substrate.
10. The method of claim 9, wherein the thermally treating further comprises thermally treating the top surface of the glass substrate at a temperature about 50 degrees Celsius to about 70 degrees Celsius higher than a temperature at which the bottom surface of the glass substrate is thermally treated.
11. The method of claim 10, wherein the thermally treating further comprises thermally treating the top surface of the glass substrate at a temperature of about 500 degrees Celsius to about 680 degrees Celsius.
12. The method of claim 9, wherein a Young's modulus of the top surface of the glass substrate is increased by about 1 gigapascal to about 6 gigapascal by the thermally treating.

13. The method of claim 12, wherein a Young's modulus of the top surface of the glass substrate yet to be thermally treated ranges from about 65 gigapascal to about 80 gigapascal.

14. The method of claim 13, wherein a Young's modulus of the bottom surface of the glass substrate yet to be thermally treated ranges from about 60 gigapascal to about 85 gigapascal.

15. The method of claim 9, wherein a density of the top surface of the glass substrate is about 0.001 kilogram per cubic meter to about 0.01 kilogram per cubic meter greater than a density of the bottom surface of the glass substrate by the thermally treating.

16. The method of claim 9, wherein a difference between a depth of layer of the top surface of the glass substrate and a depth of layer of the bottom surface of the glass substrate ranges from about 0.01 μm to about 1.0 μm by chemically strengthening.

17. The method of claim 9, wherein the bottom surface of the glass substrate comprises Sb ions.

18. The method of claim 9, wherein the thermally treating further comprises using one of an induction heating furnace, a tunnel furnace, a rapid thermal process, rapid thermal annealing equipment, and a laser process.

19. The method of claim 9, wherein the chemically strengthening comprises immersing the glass substrate in a molten salt comprising at least one of Na ions, K ions, Rb ions, and Cs ions.

* * * * *